United States Patent
Kapinos et al.

(10) Patent No.: US 11,947,718 B2
(45) Date of Patent: Apr. 2, 2024

(54) CONTENT FOCUS SYSTEM

(71) Applicant: Lenovo (Singapore) Pte. Ltd., Singapore (SG)

(72) Inventors: Robert J Kapinos, Durham, IN (US); Scott Li, Cary, NC (US); Robert James Norton, Jr., Raleigh, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/853,088

(22) Filed: Jun. 29, 2022

(65) Prior Publication Data
US 2024/0004460 A1 Jan. 4, 2024

(51) Int. Cl.
*G06F 3/01* (2006.01)
*G06T 3/40* (2006.01)

(52) U.S. Cl.
CPC ............... *G06F 3/013* (2013.01); *G06T 3/40* (2013.01)

(58) Field of Classification Search
CPC .................. G06F 3/013; G06T 3/40
See application file for complete search history.

(56) References Cited

U.S. PATENT DOCUMENTS

2012/0290973 A1* 11/2012 Robertson ............. G06F 3/0481 715/801
2017/0212583 A1* 7/2017 Krasadakis ........... G06F 3/0482

\* cited by examiner

*Primary Examiner* — Shivang I Patel
(74) *Attorney, Agent, or Firm* — Ference & Associates LLC

(57) ABSTRACT

One embodiment provides a method, the method including: detecting, using a content focus system, an attentive state of a user with respect to a display; determining, using the content focus system, the attentive state corresponds to content displayed on the display; and increasing, using the content focus system, a size of the content, wherein the increasing comprises increasing the content to a size that covers other content displayed on the display. Other aspects are described and claimed.

18 Claims, 3 Drawing Sheets

CONTENT FOCUS SYSTEM

BACKGROUND

Multi-tasking on an information handling device and/or a computer has become more prevalent as the amount of power of an operating device has increased for all types of computing devices. Multi-tasking includes the use of two or more applications, windows, and/or the like, on a single device. A device's ability to successfully run two or more applications and/or windows can provide a user with information and/or data from multiple sources while efficiently moving through a device. For example, prior to a system being able to operate in a multi-tasking environment, a user may access a single application and/or window (e.g., Internet browser window) and collect data. Such collecting of data may include printing information present within a window, or physically writing down the desired information. A user may then close the application window prior to opening a word document application, that will then be used to summarize the information collected from the window.

However, the use of information handling devices and computers today permits a user to run a plurality of windows and/or applications. This running of multiple applications allows a user to move between applications with ease. To increase a level of ease when moving through a plurality of windows present on a display of a device, a user may elect to view the windows on a large display setup consisting of one or more displays and/or monitors, an oversized monitor or display, a combination thereof, and/or the like. For example, a user elects to use two monitors coupled to a computer allowing a user to view one or more windows on each of the two monitors of the system. More space available based on the size of a single monitor and/or a combination of monitors commonly results in users having many windows open at the same time. In a situation, a user may have an extensive number of windows open, and the user's ability to concentrate on a single window and/or application may be easily influenced.

BRIEF SUMMARY

In summary, one aspect provides a method, the method including: detecting, using a content focus system, an attentive state of a user with respect to a display; determining, using the content focus system, the attentive state corresponds to content displayed on the display; and increasing, using the content focus system, a size of the content, wherein the increasing comprises increasing the content to a size that covers other content displayed on the display.

Another aspect provides an information handling device, the information handling device including: detect, using a content focus system, an attentive state of a user with respect to a display; determine, using the content focus system, the attentive state corresponds to content displayed on the display; and increase, using the content focus system, a size of the content, wherein the increasing comprises a size increasing the content to a size that covers other content displayed on the display.

A further aspect provides a product, the product including: a computer-readable storage device that stores executable code that, when executed by a processor, causes the product to: detect, using a content focus system, an attentive state of a user with respect to a display; determine, using the content focus system, the attentive state corresponds to content displayed on the display; and increase, using the content focus system, a size of the content, wherein the increasing comprises a size increasing the content to a size that covers other content displayed on the display.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
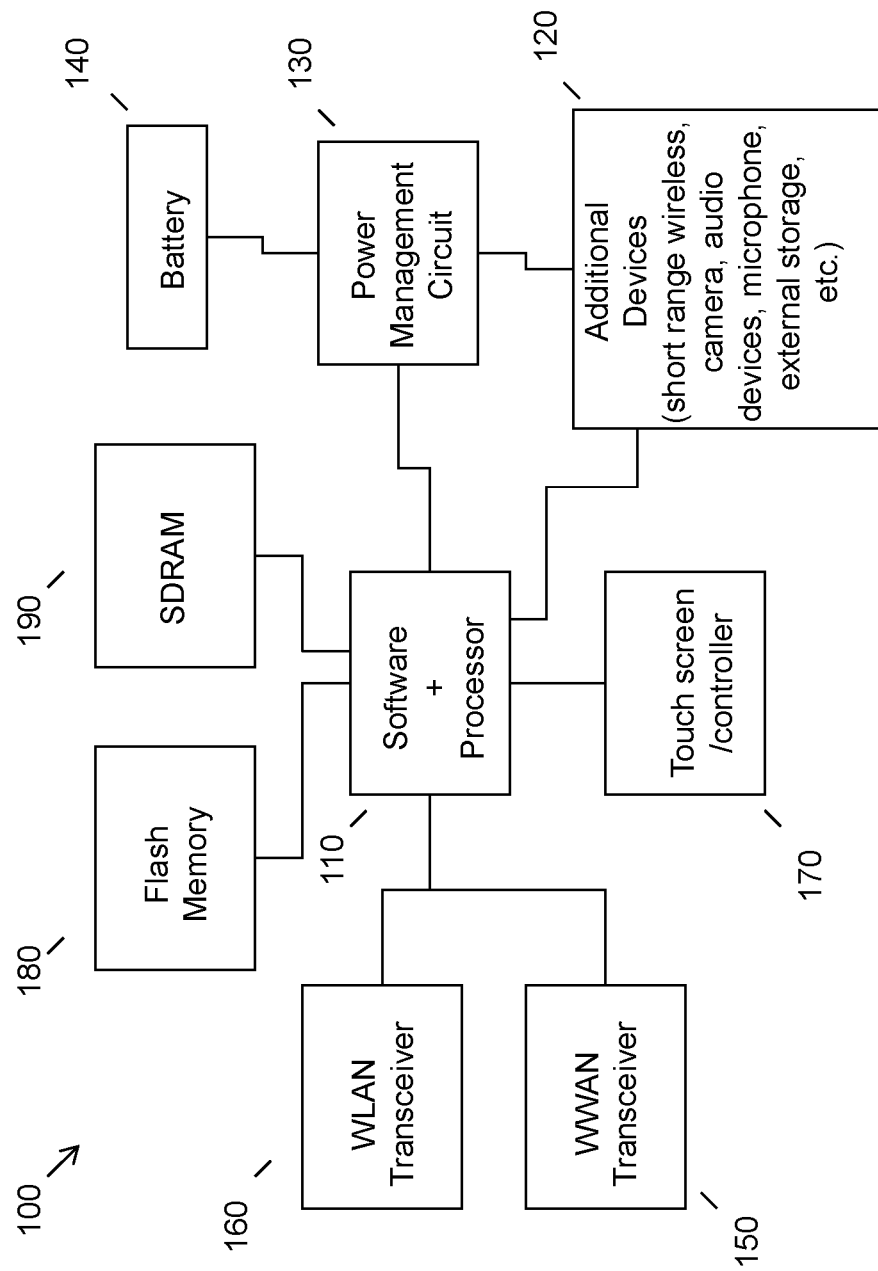
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As multitasking takes place on a device, whether an information handling device or a computer, the device may receive input indicating what content a user is attempting to view. For example, a user may click on an application icon that is already displaying content in the background of the device, and upon selection of the application icon the operating system may bring the window displaying content associated with the application icon to the forefront of the display, typically referred to as the active window. Additional user input may then be input as a user adjusts the window containing content. This adjusting of the window includes, but is not limited to, adjusting a position of the window on the display, adjusting the size of the window to assist with legibility (e.g., making window bigger so text can be made bigger), adjusting a characteristic (e.g., brightness, color, etc.) of the content within the window, adjusting a characteristic of the monitor, and/or the like.

Relying on the user to position a window to fall in-line with their personal preferences can be tedious and time consuming, particularly when a user needs to quickly reference content in a window that may be running in the background, or is not immediately viewable as one or more other windows that may be present on a display. Conventional techniques exist in an attempt to help organize and maximize the area of a display when multitasking. For example, some computer operation systems may implement a snap feature which can divide a display into two equal portions for two windows to run alongside one another. This feature may adjust more than one size characteristics of a window upon entering the snap feature.

However, the positioning of each window is predetermined by the system, which may diverge from a user's preference, and lacks an ability to adjust the content within the window on the display of the device. Additionally, this type of conventional method is limited to displaying two windows on the display at once. A display is cut in half by an operation upon designation into the snap feature, and because there are only two portions available for the display, only two windows can be displayed on a monitor coupled to the computer system using this feature. What is needed is a method that may determine a user's level of interest in content present within one of one or more windows running on the device, and being able to transition between windows with ease.

Accordingly, the described system and method provides a technique for utilizing a content focus system to determine a user's attentive state in relation to content being viewed, and thereafter adjusting the content to be positioned in an optimal location and at an optimal size. A user's attentive state may be determined based upon an amount of time in which a user is viewing content. This amount of time may provide the content focus system enough information to conclude that one or more adjustments should be made not only to the window housing the desirable content, but also to each of the one or more other windows with content not being actively viewed by the user.

Adjusting the content present on the display may include repositioning and potentially expanding or decreasing the size of a window being viewed by the user to assist with a focus level of the user. For example, the content focus system may determine that a window being viewed by the user is originally positioned along the edge of the screen and contains text having a small font. After determining the user is viewing this window, the content focus system may reposition the window to be in the center of the display of the device in use and enlarge the window and/or zoom-in on the text in the window to assist with legibility and therefore a user's ability to remain focused on content present within the window. Additionally, and used as a non-limiting example, exclusion of one or more windows not being focused on by the user may be covered or minimized to remove distractions surrounding content a user is viewing. Such a system provides an improved method for assisting a user with remaining focused on content by determining what content a user is viewing and removing the need of additional user inputs for positioning a content at an optimal position on a display.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and/or the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/rendering. System 100 also typically includes various memory devices, for example flash memory 180 and synchronous dynamic random-access memory (SDRAM) 190.

Figure 2:
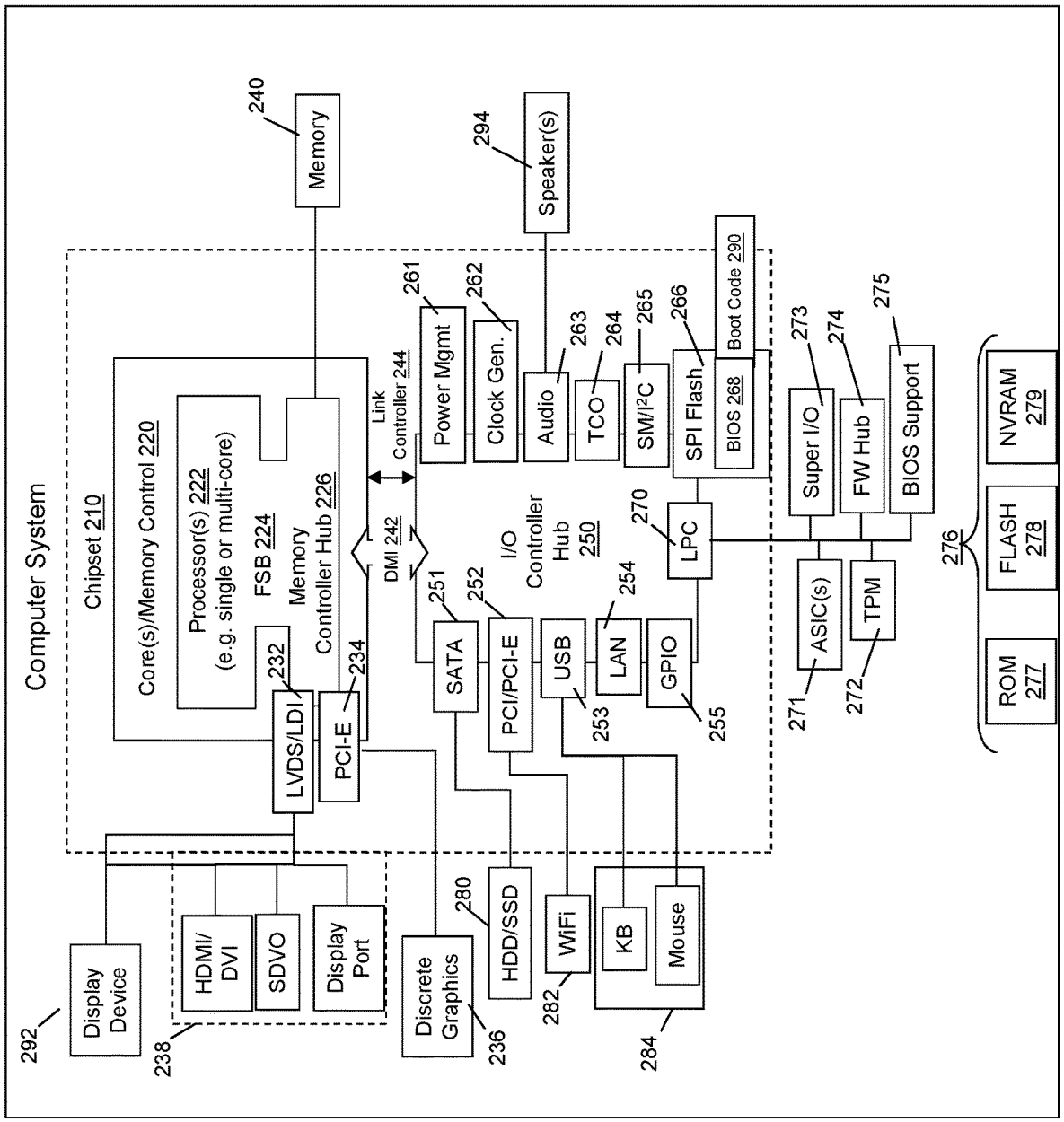
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may employ a content focus system and/or receive content data from the content focus system associated with an attentive state of the user. For example, the circuitry outlined in FIG. 1 may be implemented in a tablet or smart phone embodiment, whereas the circuitry outlined in FIG. 2 may be implemented in a personal computer embodiment.

Figure 3:
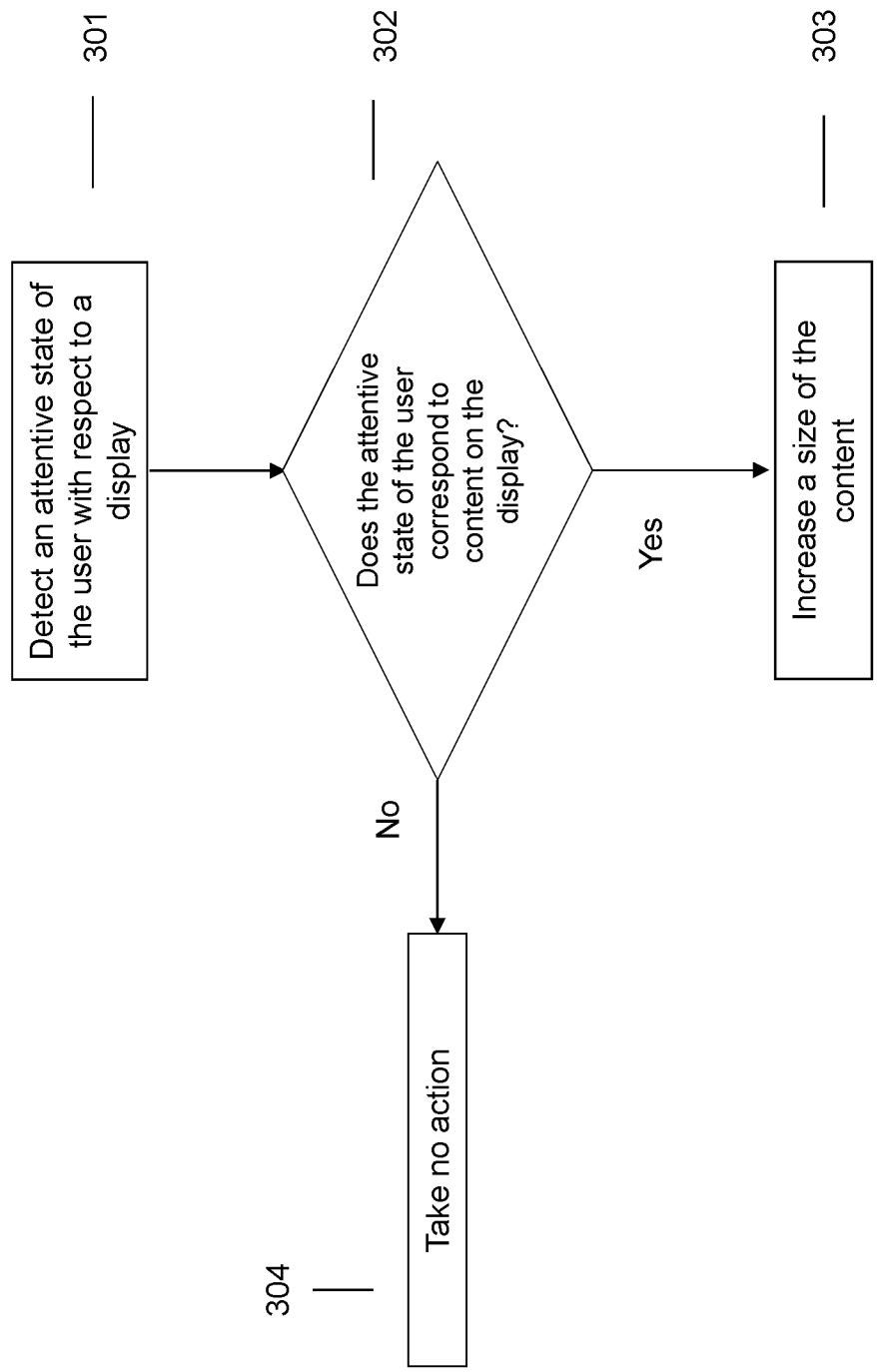
FIG. 3 illustrates an example method for increasing the size of content present on a display based upon a content focus system determining a user, based upon the attentive state of the user, is focused on the content.

FIG. 3 illustrates an example method for increasing the size of content present on a display based upon a content focus system determining a user, based upon the attentive state of the user, is focused on the content. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to dynamically adjust characteristics of one or more content windows and/or applications in use on a device of the user. Additionally, the content focus system includes modules and features that are unique to the described system.

The content focus system may be an application that runs in the background of other programs, applications, and/or receives information associated with content present on a display in which the focus system determines a user is viewing. The content focus system may be loaded or installed on an information handling device and/or computer system that a user is actively using. Additionally or alternatively, the content focus system may be loaded or installed on a secondary device or operatively coupled device that can communicate with an information handling device that the user is actively using, for example, a cloud device, a remote device, a network device, and/or the like.

As content is accessed by a user, the content focus system can monitor the content present on the display of the information handling device and/or computer, and monitor the user's direction of focus and/or emotional state to determine what content a user is viewing as described further herein. The content focus system can be automatically loaded when an operating system or other underlying application is activated or loaded. The content focus system may also be loaded upon receiving user input identifying that it should be loaded and activated, for example, the user selecting content to be displayed and viewed by the user on the display coupled to the information handling device, or other type of user input indicating that the content focus system should be activated.

The content focus system may be used in system that includes display devices that allow for displaying of content on one or more monitors, screens, displays, and/or other mechanisms or devices for providing visual output of content, generally referred to as displays here throughout. This includes systems that may have one or more displays that are connected through wired connections, wireless connections, and/or a combination thereof. Additionally, the content focus system may be used in systems that include one or more image capturing sensors, generally referred to herein as cameras throughout. Thus, the described system can be applied to information handling devices and/or computers, generally referred herein as devices, containing one or more displays and one or more cameras.

At 301, the content focus system detects an attentive state of the user with respect to a display of a device in use. The content focus system monitors the content running on a device. It should be noted that the content focus system monitors all content running on the device, including content contained within a single window on the display, content contained within active windows, content contained within background windows, content running in the background of the device, and/or the like. In the background, as utilized herein throughout the specification, refers to one or more programs containing content that may have been opened by a user but are not currently being viewed by the user, for example, an application that is minimized but not closed out by the user, content present in one or more windows that are completely covered by another window on a display, content present in one or more windows are that partially covered by another window, and/or the like. Regardless if a user is currently viewing a window containing content, each program and/or application open by a user may be monitored by the content focus system.

Monitoring such content may assist the content focus system in determining the attentive state of the user. When determining the attentive state of the user, the content focus system may receive attentive state data from one or more cameras coupled to the device. The one or more cameras may capture a variety of information associated with the attentive state of the user to determine what content a user is viewing on a display. For example, the content focus system may record a gaze of the user. The gaze of the user provides a direction that a user is orientated while a device utilizing the content focus system is in use.

As another example, an emotional state of the user may be determined by the content focus system and utilized to determine the attentive state of the user. The one or more cameras used in combination of the device may capture image data identifying emotional characteristics of a user, for example, determining an intensity level of a user's concentration when viewing content. For example, when it is determined that a user has a calm and collected demeanor when viewing content, the attentive state of the user may be at an average level. As another example, when the content focus system determines that a user is highly invested in content being displayed (e.g., sitting closer to the display, mouthing words while reading, squinting, sweating, etc.), the attentive state of the user may be at a high level.

The content focus system may utilize both the determined gaze of the user and the emotional state of the user when determining an attentive state of the user. Capturing image data indicating both the direction in which a user is orientated with relation to the display and the emotional state of the user, the system may determine what window containing content is being focused on by the user. The system may utilize additional data in assisting in determining the emotional state of the user. For example, detecting which camera is capturing the image can be useful in identifying the orientation of the user. The attentive state of the user may assist the content focus system in determining, at 302, whether content present within a window on a display is being actively viewed by the user.

The content focus system may utilize the attentive state of the user in combination with the content running on the device, subsequent to a user opening such content as mentioned previously, in determining, at 302, whether the attentive state of the user corresponds to content displayed on the display. When it is determined that the attentive state of the user does not correspond to content present on a display the system may take no action at 304. Taking no action, at 304, includes the system continuing to operate with content remaining in the same position on a display and/or within the device as one or more applications and/or programs continue to run. However, when it is determined that an attentive state of a user does correspond to content on the display, the system, at 303, may increase a size of the content being viewed by the user.

At 303, the content focus system may increase a size of the content to a size that covers other content displayed on the display of the device. In other words, a window containing content being viewed by the user as identified based upon the determined attentive state of the user may increase in size resulting in the covering of content present on the display that is not being viewed by the user. The system will prioritize a size of a content window being viewed by the user over windows containing content not being viewed. The focus content, or content being viewed by the user within a window present on the display, may receive adjustments necessary to maintain a high level of focus of the user. When the focus content is recognized by the content focus system and thereafter increases in size, the focus content may substantially fill a display of the device. By substantially filling the display of the device, thus covering windows containing over content, additional information may not be read while concentration is on the focus content. Simply covering additional information with the window containing the focus content on the display will reduce a user's desire to view the other information and/or become distracted by content not associated with the determined focus content.

Increasing the size of the window containing the focus content may occur dynamically. Increasing the size of the window may fall in line with predetermined specifications determined by the producer of the system. Additionally, or alternatively increasing the focus content window may be determined based upon user preferences. For example, a user may prefer that window of the focus content be moved towards the center of the display upon detection as focus content, and may further elect to zoom-in on the focus content as the window size increases. Characteristics of the window containing the focus content may be influenced in multiple ways, for example, a user preferred window size, text size, window brightness, window zoom, and/or the like. The content focus system may permit the customization of user window preferences.

Increasing the size of the window containing the focus content may occur automatically upon the determined attentive state of user associated with the viewing of the focus content. In other words, once the content focus system determines what a user is viewing, the system may automatically orientate the focus content window in line with the user preferences or the predetermined specifications outlined by the producer of the system. Alternatively, upon detection of the attentive state of the user and the determined content being viewed, the user may provide additional user input confirming the size of the content is to be increased. Thus, the system may wait until receiving the user input prior to adjusting the size of the content window. Different content, applications, windows, and/or the like, may have different settings, where some content is automatically resized and some content is resized after receiving user input.

There may be an instance that a user may identify the focus content prior to the content focus system. For example, prior to opening more than one program and/or application on a device, the user may designate a widow associated with one of the one or more programs and/or applications running as focus content. This designation may influence the increasing of the size of the content on the display. Subsequent to user designation of the focus content, increasing the size of the content window may occur while user selection of one or more additional applications is ongoing. Alternatively, subsequent to user designation of the focus content, increasing the size of the content window may occur after the selection of each of the one or more additional pieces of content is selected by the user.

Additionally or alternatively, after the focus content is established by the system, increasing the size of the content may iteratively increase in size by a predetermined amount at predetermined time intervals. In other words, the window containing the focus content may gradually increase in size until reaching a threshold value. Reaching the threshold value may be associated with the size of the content, for example, if the content reaches a threshold value of 75% of the screen while a user's attentive state is still determined to be viewing the content in the window, increasing the size of the window may stop. Additionally, or alternatively, reaching the threshold value may be associated with an amount of time an attentive state of the user is determined to be viewing content within a window. For example, if a user is viewing focus content for minutes and the threshold for increasing the size of the window increases 10% every minutes the focus content is being viewed, the window housing the focus content may reach 90% of the maximum size of the window. Additionally or alternatively, following the same 10% increase for every 10 minutes a user is viewing content within a window example, if a user is viewing the window for 120 minutes, the window may increase to 100% size and remain at this size for an additional 20 minutes while the attentive state of the user remains on the focus content.

In some cases, focus content may not reach 100% size of a window, also referred to as a full screen orientation. For example, the display may include content deemed non-cover content. For example, a device containing two or more windows of content with at least one of the two or more windows being labeled as non-cover content may disallow a full screen viewing of focus content because if the non-cover content is not the focus content, then the focus content window is not permitted to overlay the non-cover content window. Non-cover content simply means content that is not allowed to be covered. This may include, for example, illustrations present in a separate window but associated with the focus content, content determined to be of high importance, user selected content that may be continuously viewed, system toolbars, and/or the like.

When non-cover content is present on a display of the device but is not being viewed as determined by the user's attentive state, the position of the one or more non-cover content may remain in the same position. Additionally, or alternatively, when one or more pieces of non-cover content are present, upon determination of the focus content, the system may adjust the content windows in an orientation that increases the size of the focus content window and adjusts the position of the one or more non-cover content windows to remain available to be viewed by the user, but in a new position than its original position. For example, when a focus content window is determined by the content focus system and the system further determines that two of the other content windows present on the display are deemed non-cover content, the system may center the position of the focus content data in relation to the size of the display, and thereafter increase the size of the focus content window until reaching a maximum size for the window while maintaining a minimum size of the two other content windows labeled non-cover content. In this example, the focus content window may be the largest content window present on a display and the two non-cover content windows will remain legible but at a smaller window size and in a less prominent location.

Upon determining that the attentive state of the user no longer corresponds to content previously determined as focus content, the system may then reduce the size of the content back to a default setting size. Alternatively, the system may reduce the no longer focus content back to a previous size prior to being labeled as focus content, which may also be a default setting size. Additionally, or alternatively, subsequent to determining the attentive state of the user is no longer affiliated with the focus content, the system may minimize the window and/or exit the program no longer being viewed by the user. Reducing the size of the previously determined focus content may be established by the producer of the product or customizable by the user. Upon determining the focus content is no longer being viewed, the window of the prior focus content may remain at its increased size and require user input. The content focus system may determine that the attentive state of the user has shifted, and as a result a potential reduction in size may occur automatically or require additional user input to decrease the size of the previously identified focus content window.

The various embodiments described herein thus represent a technical improvement to conventional methods for assisting a user with remaining focused on content by determining what content a user is viewing and removing the need for additional user inputs for positioning a content at an optimal position on a display. A detection of an attentive state of the user used in combination with the one or more pieces of content being displayed on a display of a device may thereafter be utilized to determine what content a user is focusing on. From the determination of focus of the user, the system may perform adjustments to the display highlighting the information being focused on and minimizing, reducing, or even eliminating the other content present on the display, or running in the background, by covering an additional content window with the window containing the focus content and/or reducing the size of the other windows present on the display a user is not viewing. Such adjustments to a display encourage the concentration of the user on the focus content while negating distractions provided by additional content present on a display.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
  detecting, using a content focus system, an attentive state of a user with respect to a display, wherein the attentive state corresponds to a level of focus of the user;
  determining, using the content focus system, the attentive state corresponds to content displayed on the display;
  identifying, using the content focus system, additional content present on the display, wherein the additional content comprises at least one of: other content and non-cover content; and
  increasing, using the content focus system, a size of the content, wherein the increasing comprises increasing the content to a size that covers the other content displayed on the display and is performed in view of the non-cover content.

2. The method of claim 1, wherein detecting the attentive state comprises detecting at least one of a gaze of the user and an emotional state of the user.

3. The method of claim 1, further comprising determining a length of time the attentive state is associated with the focus content and wherein the increasing is responsive to the length of time meeting a predetermined threshold.

4. The method of claim 1, wherein the size that covers other content comprises a size that substantially fills the display.

5. The method of claim 1, wherein the content is contained within a window on the display and wherein the increasing comprises increasing the size of the window.

6. The method of claim 1, wherein the increasing is responsive to receiving user input confirming the size of the content is to be increased.

7. The method of claim 1, further comprising:
  determining the attentive state no longer corresponds to the focus content; and
  reducing the size of the content to a default size setting.

8. The method of claim 1, further comprising identifying the content corresponds to content the user has identified as focus content and wherein the increasing is responsive to identifying the content corresponds to focus content.

9. The method of claim 1, wherein the increasing comprises iteratively increasing the size of the content a predetermined amount at predetermined time intervals.

10. An information handling device, the information handling device comprising:
  a processor;
  a memory device that stores instructions that, when executed by the processor, causes the information handling device to:
  detect, using a content focus system, an attentive state of a user with respect to a display, wherein the attentive state corresponds to a level of focus of the user;
  determine, using the content focus system, the attentive state corresponds to content displayed on the display;
  identify, using the content focus system, additional content present on the display, wherein the additional content comprises at least one of: other content and non-cover content; and
  increase, using the content focus system, a size of the content, wherein the increasing comprises increasing the content to a size that covers the other content displayed on the display and is performed in view of the non-cover content.

11. The information handling device of claim 10, wherein the detecting the attentive state comprises detecting at least one of a gaze of the user and emotional state of the user.

12. The information handling device of claim 10, further comprising determining a length of time the attentive state is associated with the content and wherein the increasing is responsive to the length of time meeting a predetermined threshold.

13. The information handling device of claim 10, wherein the size that convers other content comprises a size that substantially fills the display.

14. The information handling device of claim 10, wherein the content is contained within a window on the display and wherein the increasing comprises increasing the size of the window.

15. The information handling device of claim 10, wherein the increasing is responsive to receiving user input confirming the size of the content is to be increased.

16. The information handling device of claim 10, further comprising:
  determining the attentive state no longer corresponds to the content; and
  reducing the size of the content to a default size setting.

17. The information handling device of claim 10, further comprising identifying the content corresponds to content that the user has identified as focus content and wherein the increasing is responsive to identifying the content corresponds to the focus content.

18. A product, the product comprising:
a computer-readable storage device that stores executable code that, when executed by a processor, causes the product to:
detect, using a content focus system, an attentive state of a user with respect to a display, wherein the attentive state corresponds to a level of focus of the user;
determine, using the content focus system, the attentive state corresponds to focus content displayed on the display;
identify, using the content focus system, additional content present on the display, wherein the additional content comprises at least one of: other content and non-cover content; and
increase, using the content focus system, a size of the content, wherein the increasing comprises increasing the content to a size that covers the other content displayed on the display and is performed in view of the non-cover content.

* * * * *